Nov. 8, 1966 E. W. SPANNHAKE ETAL 3,283,832
HYDRAULIC HAMMER
Original Filed Dec. 10, 1962 7 Sheets-Sheet 1

Fig. 1.

INVENTORS.
ERNST W. SPANNHAKE.
BY GEORGE GENDRON.
Ward, Haselton, McElhannon, Orme, Brooks & Fitzpatrick
ATTORNEYS.

Fig. 1a.

SYSTEM LOCKED — C

A — DRIVES RAM DOWN

SYSTEM DRAINED — D

B — RAISES RAM

SYSTEM OPERATING — E

INVENTORS.
ERNST W. SPANNHAKE.
GEORGE GENDRON.
BY Ward, Haselton, McElhannon, Orme, Brooks & Fitzpatrick
ATTORNEYS.

Nov. 8, 1966   E. W. SPANNHAKE ETAL   3,283,832
HYDRAULIC HAMMER
Original Filed Dec. 10, 1962   7 Sheets-Sheet 5

Fig. 5.

INVENTORS.
ERNST W. SPANNHAKE.
BY GEORGE GENDRON.

Ward, Haselton, McElhannon, Orme, Brooks & Fitzpatrick
ATTORNEYS.

3,283,832
HYDRAULIC HAMMER

Ernst W. Spannhake, Smoke Rise, and George J. Gendron, Oradell, N.J., assignors to Raymond International Inc., New York, N.Y., a corporation of New Jersey
Original application Dec. 10, 1962, Ser. No. 243,435, now Patent No. 3,237,406, dated Mar. 1, 1966. Divided and this application July 21, 1965, Ser. No. 473,670
4 Claims. (Cl. 173—126)

This application is a division of copending application Serial No. 243,435, filed December 10, 1962 now Patent No. 3,237,406.

This invention relates to pile driving hammers and the like and more particularly to hydraulically operated hammers.

For many years, it has been the general practice to drive piles by the use of steam hammers. Yet such steam hammers have a number of serious disadvantages. For example, the steam pressure which may in practice be used is generally limited to about 150 pounds per square inch, and with such relatively low pressures, in order to provide a differential piston arrangement of such size as to operate a 5000 pound ram, the upper piston must be of a diameter such that substantial portions at least of the hammer must extend above the pile driving core. This in turn minimizes the available headroom in the pile driving assembly, which is an important factor, particularly in the case of the driving of long piles. Where an even heavier ram is required, for example up to 15,000 pounds or more, the size of the piston and cylinder assembly must be correspondingly increased, and to dimensions such that difficulty may be encountered in finding sufficient space to support the hammer between the pile driver leads unless the latter and the supporting structure therefor are made excessively bulky and heavier than is the present practice. Another disadvantage of steam hammers resides in the fact that the overall efficiency in the use of fuel, of the steam boiler and steam hammer, is very low. Also the burning of fuel for the boiler creates a smoke nuisance and fire hazard, and as the steam which escapes from the hammer generally contains some oil, this creates a further nuisance as well as objectionable noise.

Upon superficial consideration, it would appear that the above difficulties with steam hammers for the purpose could be overcome by the use of hydraulic hammers, since by the use of hydraulics, operating pressures of thousands of pounds are possible, to be maintained by pumps driven with high efficiency from internal combustion engines, thereby avoiding the nuisances and losses of inefficient boilers and of discharging steam. Also hydraulic pistons may be made quite small, even for operating the heaviest rams, and small enough conveniently to suspend the hammer between the leads of standard pile drivers, even though the ram used is much heavier than heretofore generally attempted.

However, practical experience in the use of hydraulic pistons for moving large masses connected thereto has demonstrated that serious difficulties are encountered in attempts to move the piston at a rate faster than a few feet per second, due to the destructive hydraulic shocks occurring when the valves and the direction of stroke are reversed. Such speed is much too low for efficient pile driving. Experience has also shown that the moving of large masses operated by hydraulic pistons cannot be achieved successfully unless the assembly is accelerated and decelerated at controlled rates such as to avoid hydraulic shock on the system and consequent breakage of pipes, pumps and other components of the system.

In view of the above difficulties inherent in the application of hydraulics to pile driving techniques, little progress has been made to date in the transition from steam driven to hydraulically actuated hammers for such applications.

The present invention, provides, however, what has been demonstrated by field operations to constitute a successful solution of the problem of providing a commercially feasible hydraulically actuated hammer for the driving of piles and the like at a high percussion rate of heavy and positive blows, effective for rapidly sinking piles in the ground, and consistent with elimination for practical purposes, of hydraulic shocks or "hammering" and breakage of equipment.

In accordance with a basic principle of the invention, these desirable objectives are achieved in one aspect thereof by subjecting the hydraulic liquid, such as water or oil, supplied under pressure to the operating cylinder of a hydraulic hammer, to the resilient compression of a volume of compressed gas located immediately adjacent said operating cylinder. This may be conveniently accomplished according to this feature of the invention, by mounting an accumulator immediately adjacent, i.e., within a few inches or so of the operating cylinder for the hammer, and precharging this accumulator with gas under approximately two-fifths of the operating pressure of the hydraulic liquid supplied to the cylinder. For example, an effective operating pressure for the hydraulic liquid has been found to be about 5000 p.s.i., with respect to which the accumulator is precharged with gas to pressure of about 2000–2200 p.s.i. For effectively eliminating hydraulic shocks in the operation of the hammer, we have found that the volume of the accumulator should be on the order of about 5 to 20 times the cylinder displacement volume below the piston.

We have found that as the accumulator is increasingly displaced from the operating cylinder of the hammer and along the pressure line of hydraulic supply to the cylinder, that it becomes increasingly less effective in minimizing shock and disruption in the hammer operation, owing to the inertia of the hydraulic liquid in the intervening section of the supply line. We have found that for best operation the accumulator should not be spaced more than a foot or so distant from the hammer cylinder and preferably should be located within a few inches thereof.

We have further found that by so locating the aforesaid accumulator immediately adjacent the hammer operating cylinder, that this permits of operating the hammer from discharge pumps of substantially constant volumetric output flow rate of the hydraulic liquid, corresponding to the average demand of the hammer cycle rather than the high instantaneous demands that would be required in the absence of the accumulator. In addition, since the presence of the accumulator permits of thus operating the hammer from pumps supplying the average demand of hydraulic fluid, it further permits of the use of pressure hoses of moderate size extending from the pumps to the hammer.

The accumulator above discussed is hereinafter referred to as the "inlet" accumulator because it is connected to the pressure line suppyling hydraulic liquid under high pressure to the hammer operating cylinder.

We have discovered in accordance with another aspect of the invention, that the operation of the hammer is further improved and rendered more flexible in performance and free from hydraulic jolts and shocks, by mounting a second and smaller accumulator adjacent the hammer operating cylinder and connecting the same to the drain line extending therefrom. This second accumulator, referred to herein as the "outlet" accumulator is likewise precharged with air to provide a compressed gas cushion in the outlet drain line from the operating cylinder. This outlet accumulator is precharged with gas preferably to a pressure about 100 p.s.i.

By virtue of the connection of these accumulators to the pressure and drain lines extending respectively to and from the hammer operating cylinders, and at points immediately adjacent thereto, the piston within the operating cylinder in effect works against the compressed gas cushions provided by the accumulators, and is thereby resiliently brought to rest at the termination of successive up and down strokes whereby jolting and shocks in the hydraulic system are disposed of.

In accordance with still another aspect of the invention, a novel cycling valve arrangement is employed for alternately connecting the hammer operating cylinder to the pressure and drain lines, respectively, at the periodicity required for the specified rate of piston reciprocation. This consists in the use of a linkage for actuation of a hydraulic cycling valve which is initiated sufficiently in advance of the hammer impact to minimize inertia forces, but which confines the hydraulic forces effecting hammer reversal to an interval just prior to the hammer impact. Typically this linkage will initiate actuation of the hydraulic valve approximately six inches before the hammer impact but confines the actual hammer reversal to the last two inches before impact. This is accomplished by first converting the up and down hammer motion by means of a constant acceleration-constant deceleration cam, into a rotating motion and then converting this rotary motion by means of a toggle linkage into a linear motion again. This has the additional advantage of permitting the use of slide valves which are less expensive and easier to maintain and service than their rotary counterparts.

Another feature of the invention consists in the employment of a valve of sufficient overlap between pressure and discharge ports, of for example ¼ to ⅓ the total stroke, so that the operating cylinder of the hammer is always connected to an outside line, thus preventing dangerous surges inside its confines due to heavy masses of the ram moving at high speeds. This desired action is further facilitated by setting the precharge of gas volume in the inlet accumulator at roughly two-fifths of its operating pressure as above stated, and also by setting the starting discharge of the constant displacement pumps for the hydraulic pressure line at a rate such as to produce roughly 100 hammer blows per minute. The latter measure will also prevent the hammer from hanging up on its first stroke on valve reversal.

In accordance with the constructional features of the hydraulic hammer of the invention, the hammer assembly comprises a base plate above which is disposed a top plate, these two plates being integrated in spaced relation by a series of interposed, upstanding steel tubes or column sleeves welded to the base plate. The accumulators and the slide valves and appurtenant linkage and rotary cam follower actuating components are mounted on the base plate. Also integrated with one of the column sleeves is a guide for linear displacement of the constant acceleration-constant deceleration cam which actuates the rotary cam follower. The hammer operating cylinder is suspended at its upper end from the top plate, in a suspension of the universal type, while its lower end is received in a fairly closely fitting aperture of the base plate. The piston rod extends from the operating cylinder below the base plate and has secured to its lower end a driving ram. The ram is displaceably guided by sleeve encased cables which extend through the above-mentioned column sleeves and thence through bores in the top plate for reception of supporting nuts threaded thereon. The cables extend at their lower ends into a driving base disposed beneath the ram and are anchored therein. The top plate is surmounted by a sheave housing to which are journaled a pair of sheaves for cable suspension of the hammer. The above-mentioned cam is mechanically linked to the ram for reciprocation therewith. Suitable plumbing connections extend between the accumulators, valve and hammer operating cylinder for effecting the hydraulic actuation above discussed.

For energizing the hammer, there is mounted on a crane, truck or the like at ground level, a gas or diesel engine with hydraulic pumps driven thereby, valves for switching the hydraulic supply "on" or "off" and a reserve tank for the hydraulic fluid. A hoseline interconnects the ground based hydraulic supply and the hammer.

Reference will now be had to the annexed drawings for a more detailed description of the invention in its various aspects wherein:

FIG. 7 is a plan view, partly in section, of the cam-actuated slide valve assembly shown in FIG. 2; while

Figure 1:
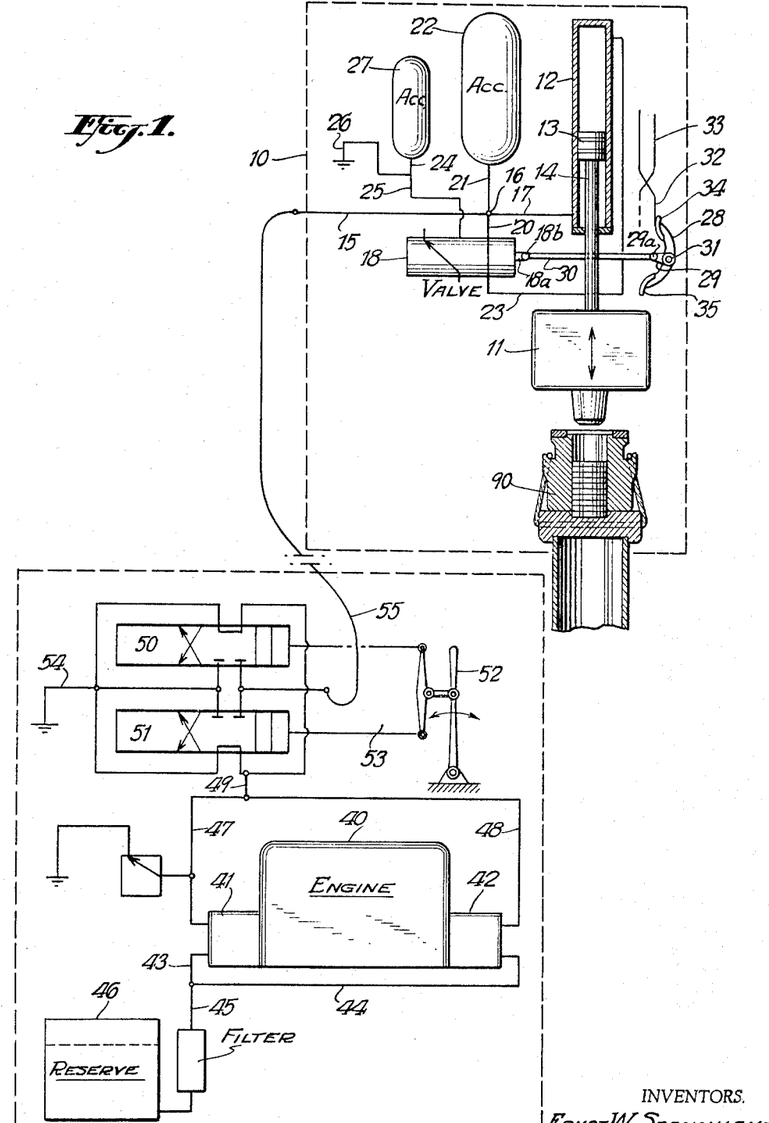
FIG. 1 is a diagrammatic showing of the essential components of the hydraulic hammer assembly in accordance with the invention and appurtenant components required for operation thereof.

Referring first to the schematic showing of FIG. 1, the hydraulic hammer assembly of the invention comprises the components shown within the rectangle 10, and consists of a ram 11, above which is mounted a hydraulic cylinder 12, within which is slidably disposed a piston 13, having integral therewith a piston rod 14, which extends through a bore through the base of the cylinder to the ram 11, being secured thereto. A pipeline 15 for supplying hydraulic fluid under pressure, such as water or oil, is tapped through a distributor box 16 and through a pipeline 17, to the base of the cylinder below the piston 13, for injecting the hydraulic fluid under pressure into the lower cylinder cavity, thereby tending at all times during operation to force the piston upward. From the distributor box 16, a tap-off connection 20 extends to a slide valve 18, and another tap-off connection 21 extends therefrom to an inlet accumulator 22. The inlet accumulator is precharged with gas under pressure as above stated to a pressure of about two-fifths that of the hydraulic liquid supplied over the pressure line 15. From valve 18 a pipeline 23 extends to the top of the cylinder 12. A drain line 25 extends from the slide valve 18 to low pressure discharge, as at 26. A tap-off connection 24 extends from the drain line to a second and smaller, outlet accumulator 27, precharged with gas under pressure to about 100 p.s.i. as above explained.

Figure 1A:
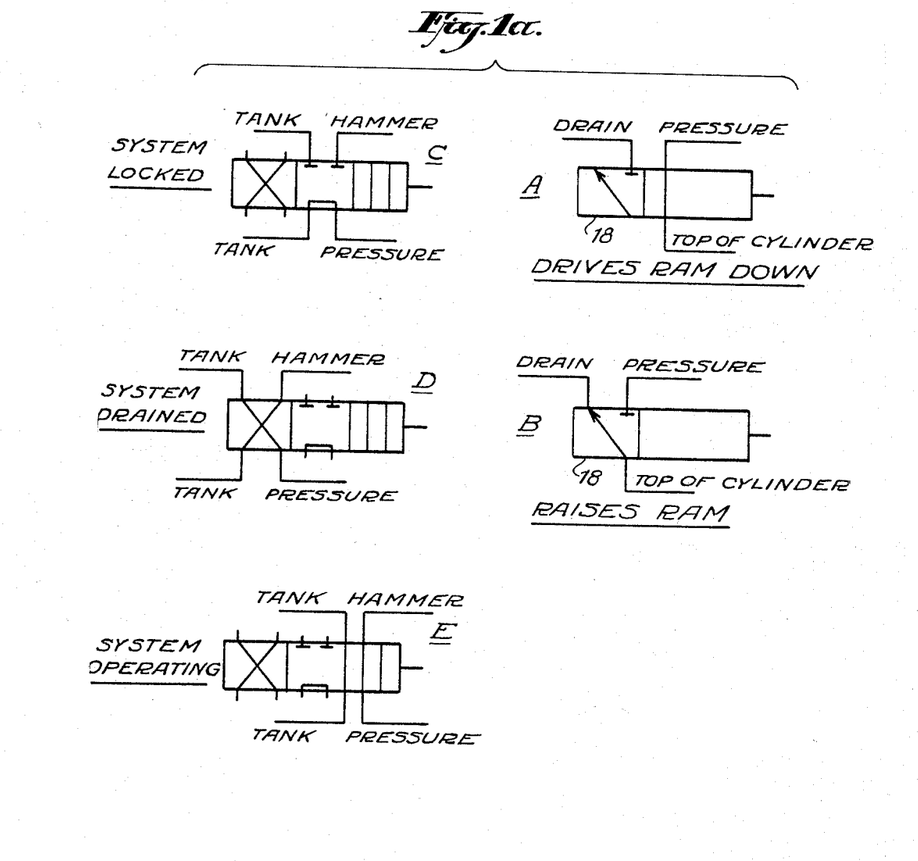
FIG. 1a is a schematic showing of the valve connections of the FIG. 1 drawing for the various positions of actuation of the valves therein shown.
Figure 6:
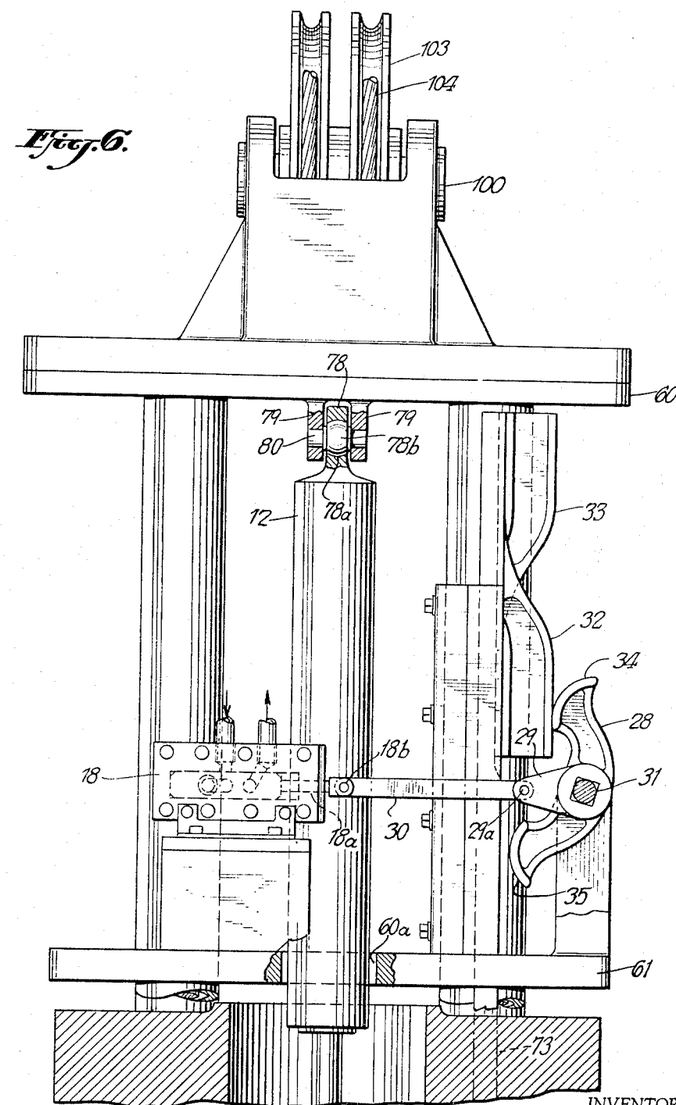
FIG. 6 is a view in side elevation of the FIG. 2 showing as viewed from the left of FIG. 2.

The slide arm 18a of the valve 18, is actuated between positions A and B, FIG. 1a, by means of a cam follower and linkage assembly 28, 29, 30 FIGS. 1 and 6. The cam follower 28 is keyed to a shaft 31, and is oscillated clockwise and counterclockwise by a pair of cams 32, 33, connected to the ram 11, in the manner explained below, and which therefore move up and down with the ram. The cams 32, 33 are mounted one behind the other as viewed in FIGS. 1 and 6, and each is formed as shown, with an elevated and a depressed portion, disposed in inverse relation to one another. The cam follower 28 is provided with a pair of relatively offset faces 34, 35, positioned to engage the cams 32, 33, respectively.

Referring more particularly to FIG. 6, as the ram 11 moves up, the face 34 will ride up into the raised portion of cam 32, and thus rotate cam follower 28 clockwise until the cam follower arm 29 assumes the horizontal position shown, to move the link 30 to the left owing to the pin connection 29a between them, and thus actuates the slide valve arm 18a to the left or position A of FIG. 1a due to its pin connection 18b with link 30. Alternatively, as the ram moves down, the cam follower face 35 rides up onto the elevated portion of cam 33, as face 34 thereof rides down onto the depressed portion of cam 32. This rotates the cam follower 28 counter-clockwise and thereby swings the cam follower arm 29 downward to pull the link 30 to the right and thus actuate the slide arm 18a of valve 18 to its right-hand position for positioning the valve, as shown at B, FIG. 1a.

Referring to FIGS. 1 and 1a, it will be observed that with valve 18 in position A, the pressure line 20 is connected through the valve to line 23 extending to the top of cylinder 12, so that the hydraulic fluids flows under pressure into the upper cylinder cavity. This forces the piston down, against the upward pressure exerted thereon by the fluid pressure in the lower cavity, which is continuously connected to pressure line 17. This results from the fact that the total force exerted downwardly on the piston exceeds the upward force by an amount equal to the product of the hydraulic pressure and the sectional area of the piston rod 14, the upward and downward forces acting on the remaining annular portions of the upper and lower piston faces being balanced. On the other hand with the valve actuated to position B, line 23 from the top of the cylinder is connected through the valve to the drain line 25, thus releasing the pressure above the piston, which thereby is forced upward by the continuous hydraulic pressure applied to the lower cylinder cavity via pressure line 17.

Referring to FIG. 1, for supplying hydraulic fluid under pressure to line 15, there is mounted on a truck, crane or the like, at substantially ground level, a prime mover 40, such as a gasoline or diesel engine, on the opposite shaft ends of which are mounted a pair of constant displacement hydraulic pumps 41, 42, having input pipelines 43, 44, connected over a line 45, containing a filter, to a supply tank 46, of hydraulic liquid to be pumped under pressure by the pumps over output pressure lines 47, 48, extending therefrom and through a pipe connection 49, to a pair of slide valves 50, 51, connected in multiple. These valves are manually and concurrently shifted by means of a hand lever 52 and an appurtenant linkage mechanism 53, to any of three positions, comprising central, right and left, respectively.

Extending from these valves are a drain line 54 and a pressure hoseline 55, the latter extending to the pressure line 15 of the hydraulic hammer. Manipulation of the switch 52 to the center, left or right settings, connects the input and output pressure lines 49 and 55, and the drain line 54 through the valves 50, 51, in the manner shown at C, D and E, respectively, of FIG. 1a. In position C, the input pressure line 49 is connected to the tank or drain line 54, and is disconnected from the pressure feedline 55 extending to the hammer, so that the system is locked in an inoperative position. In position D, both the input pressure line 49 and the hammer line 55 are connected to the tank line 54, so that in this position also the hammer is inoperative. In position E, the input pressure line 49 is connected to the hammer line 55 for continuously supplying the hydraulic fluid under pressure to the hammer pressure line 15, and thence into the lower cylinder cavity, and over line 20 to the slide valve 18, thus to oscillate the ram 11 in the manner above described.

Reverting now to FIGS. 1 and 1a, a more detailed description of the hammer action can now be given by first considering the hammer in its most downward position. In this position the cycling valve 18 is in position B. First there is an upward force on piston 13 and ram 11 causing them to rise. The oil pressure in the area under the piston is such, that the ram not only rises but accelerates constantly in doing so. After a certain portion of the upward stroke, the cam 32 through its action on the cam follower 28, puts slide valve 18 into position A, whereupon the forces on the ram as described above is reversed and is now acting downward. Since, however, the hammer has accumulated a considerable velocity, this force reversal does not immediately stop the hammer, but only serves to decelerate it. While it is continuing to rise, it will discharge a considerable amount of liquid from the upper cylinder cavity through line 23 into the distribution box 16. Part of this will be used to replenish the cylinder cavity volume below the piston through line 17, while the excess will go through line 21 into the inlet accumulator 22 which now serves as an hydraulic liquid and energy storage space for the down stroke.

In other words on all high speed hammers made according to this invention, this amount of energy and liquid storage and energy and liquid discharge, can be made a considerable multiple of the continuous energy supply through lines 55 and 15 from the supply pumps 41 and 42 of the hydraulic circuit. Momentary flow and energy exchange through the cycling valve 18 in our invention is adjusted to be from about 5 to 10 times the continuous hydraulic liquid supply which is furnished over line 55 from the pumps 41 and 42. The greatest amount of liquid demand occurs at the moment of ram impact onto the capblock 90. At this moment, the accumulator 22 carries its lowest liquid volume and its lowest amount of stored energy. It carries its highest liquid volume and its highest amount of stored energy somewhere in the neighborhood of the top of the ram stroke.

It has been our discovery in accordance with a further aspect of our invention, that by making all connections 17, 20 and 21 between the distributor box 16, and the cylinder 12, the valve 18 and the accumulator 22, and also connection 23, of relatively large cross-section compared to that of the supply line 55, i.e., about three to four times as large, that the following advantages are achieved:

(1) The accumulator 22 can be made comparatively small and still result in a working cycling system of the kind described. As a matter of fact it will still be satisfactorily operative when having a total volume as low as about five times the displacement volume of the cylinder. Operation can be improved by making the accumulator volume larger, but beyond about 20 times the cylinder volume, further improvement is negligible.

(2) Line 55 can thus be designed essentially to carry solely the continuous discharge of pumps 41 and 42. It is this feature of our invention which has made the hydraulic hammer truly practical, since a supply line 55 of small internal diameter on the order of an inch or so, is thus made sufficient to carry the requisite liquid flow to the hammer without interfering with the proper operation of driving, and since this small line 55 can now be carried all the way up to the hammer by making the accumulator an integral part of the hammer structure.

Due to the comparative smallness of the accumulator, the above described accumulator action makes it necessary to have a positive liquid level within it during this cycling operation of the accumulator. At the same time the high hydraulic pressures employed make it necessary to utilize a gas precharge of reasonably high pressure in the accumulator, so that upon compression, the gas volume does not become too small, as this otherwise would cause excessive pressure fluctuations during the energy exchange of the accumulator. We have found that for an accumulator of about 5 to 20 times the cylinder volume, a gas precharge pressure of about two-fifths the hydraulic operating pressure, gives optimum operation. However, on starting the hammer, this value for the gas precharge will make the hammer motion slow at start-up due to the much smaller forces now applied in raising and lowering it. This leads to a problem of self-starting of the cycling motion. Because of the rather rapid upward motion of the hammer when normally operating, valve 18 always has to permit sufficient fluid to escape through line 23 on the upward motion of the hammer to prevent the pressure in the upper cylinder from rising excessively. This in our invention is accomplished by having sufficient overlap in the cycling valve that at the moment of transition between positions A and B, FIG. 1a, there is an interval of time when lines 20 and 25 are directly connected. During normal operation the duration of this direct connection is exceedingly small due to the rapid motion of the hammer at the time of transfer from position B to position A. However on starting, when the hammer moves slowly it is possible for the duration of this interval to become so long that the accumulator actually bleeds down at every stroke to its initial charging pressure thus preventing normal pumping up of the accumulator provided by our cycling set-up, to the final operating pressure. For this reason the amount of this overlap has to be held within certain limits such as to generate sufficient resistance to prevent excessive bleeding.

We have found that if this overlap is so designed that at the normal operating speed of the hammer with the valve in its centered position, the pressure drop through the valve from the cylinder to the discharge line is more than 60% and not more than 100% of the operating cylinder pressure, the hammer will be self-starting, provided also that the interval of overlap is confined by a suitable linkage between the hammer and valve—such as that above-described—to a hammer movement of less than 0.8 inch on the upstroke. In this way the accumulator will not bleed down at every cycle if started at about 80% of its full hydraulic fluid supply. The manner of achieving this valve overlap will be described below with reference to FIGS. 7 and 8.

Turning now to FIG. 6, it can be shown that the linkage 29, 30, for the actuating of cycling valve slide arm 18a, makes it possible to use constant acceleration and constant deceleration cams 32, 33, for actuation of a cam follower 28, cam arm 29 and shaft 31, of considerable fly-wheel mass, and still permit the slide valve to reverse the hammer motion, on its downward stroke at the last possible moment. FIG. 6 shows the slide valve in position A of FIG. 1a, at which a downward force is exerted on the ram bringing it down to strike the capblock. In this position the pin connections 29a, 18b, between link 30 and arms 29 and 18a, respectively, form a horizontal line with the center of shaft 31. Hence, when cam 33 actuates the cam follower 28 by impinging on its surface 35, the displacement of slide arm 18a of valve 18, is initially very small due to the position of the toggle linkage being at dead center. But as the downward motion of arm 29, carrying the linkage rod 30 to the right, continues from dead center to about 60° below dead center, it imparts continuously increasing increments of motion to the slide arm 18a of valve 18, for successive increments of angular rotation of the cam follower 28. This results in the fact that although the rather large masses of the cam follower assembly are being handled on a constant acceleration-constant deceleration basis, thus making the reaction forces on the cam surfaces a minimum with a resultant minimum in wear, the movement of the cycling valve slide arm 18a, is completely different, resulting on a very slow initial motion with a subsequent very rapid acceleration and subsequent rapid stop towards the end of its motion. This results in the overall effect that although motion of cam follower 28 is initiated about six inches before impact force, reversal due to the motion of the valve does not take place until about two inches before impact. This in turn results in the highest possible impact speed of the hammer with a given stroke. It should be realized that this action of the valve happens in reverse on the upstroke of the hammer. In other words, force reversal occurs rather quickly after cam 32 has made contact with cam surface 34 of cam follower 28. Since, however, we have seen in the above description that the hammer on the upstroke travels a considerable distance after force reversal has occurred, the motion of valve 18 is carried to completion at the operating speed of the hammer, and at no excessive throttling, due to partial opening of the valve occurring on the downward stroke. Actual high speed motion pictures of the hammer in operation have shown that hammer efficiencies in excess of 90%, can be achieved with this linkage.

Figures 2, 3:
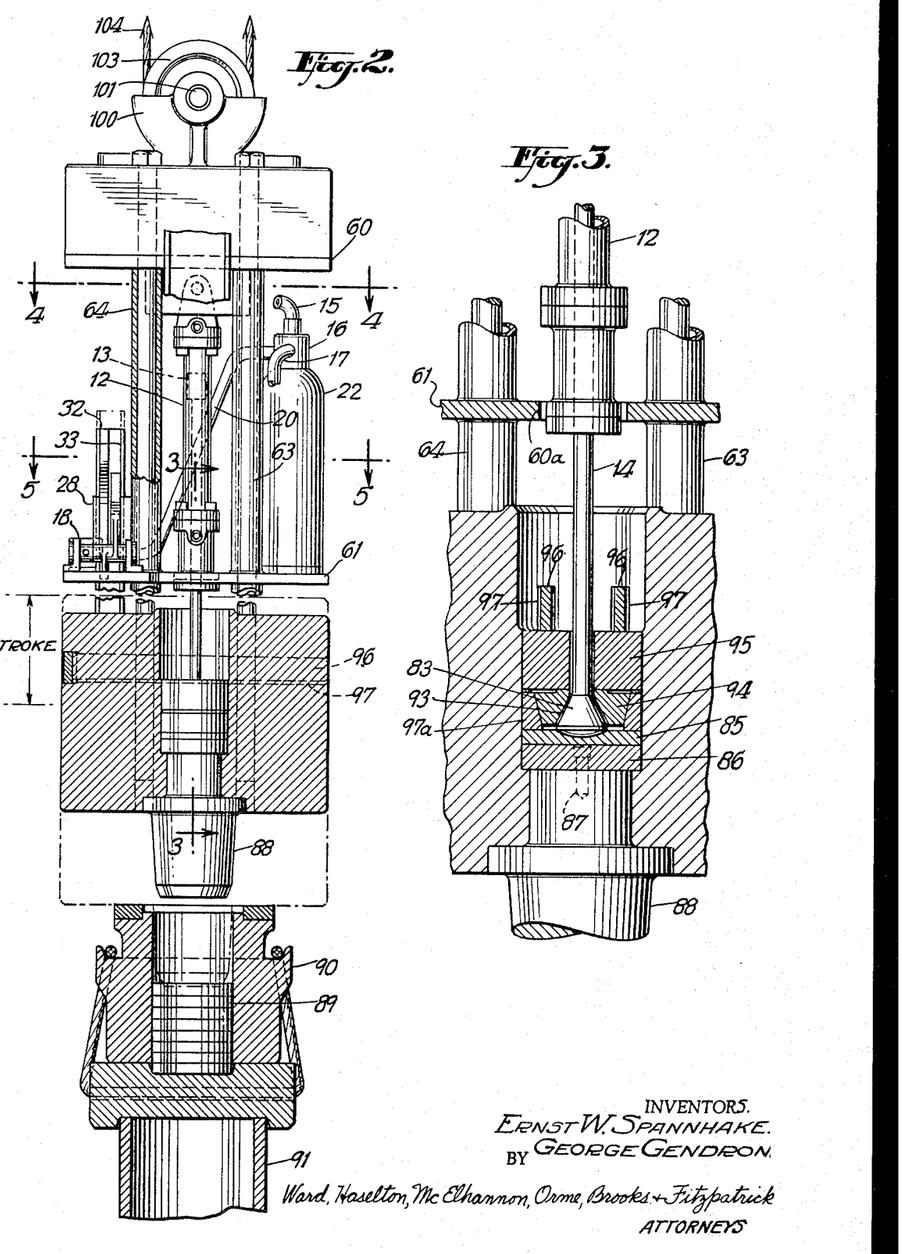
FIG. 2 is a front elevation partly in section of the hydraulic hammer assembly.
FIG. 3 is an enlarged, fragmentary longitudinal sectional elevation of the FIG. 2 showing as taken at 3—3 of FIG. 2.
Figure 4:
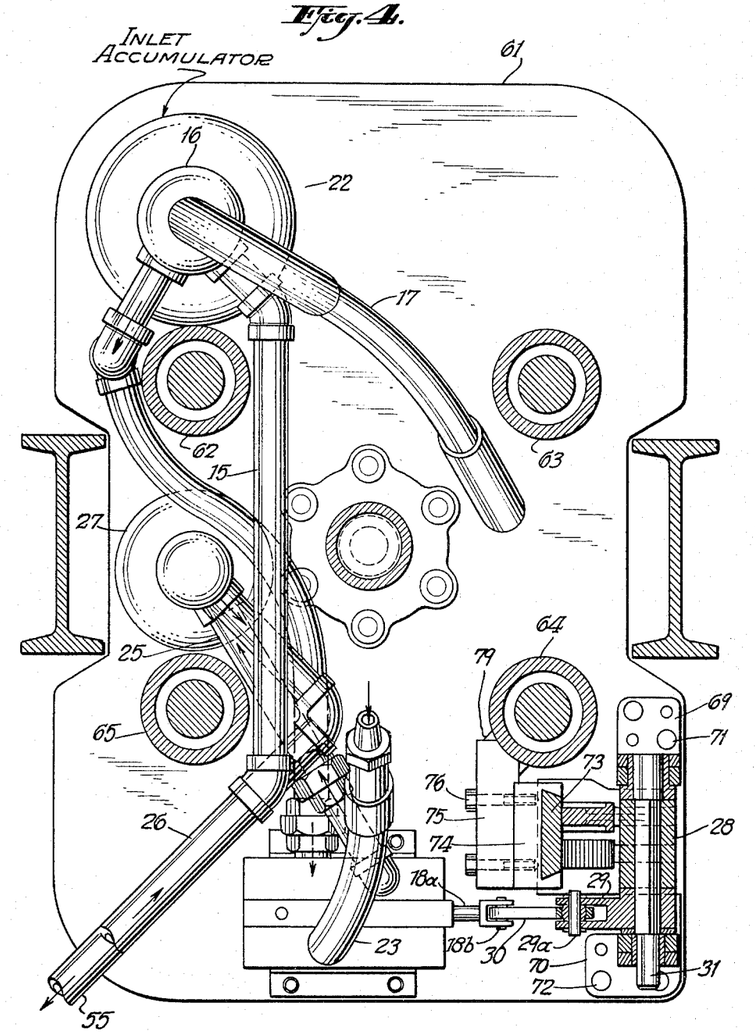
FIG. 4 is a transverse sectional plan view of the FIG. 2 showing as taken substantially at 4—4 of FIG. 2.
Figure 5:
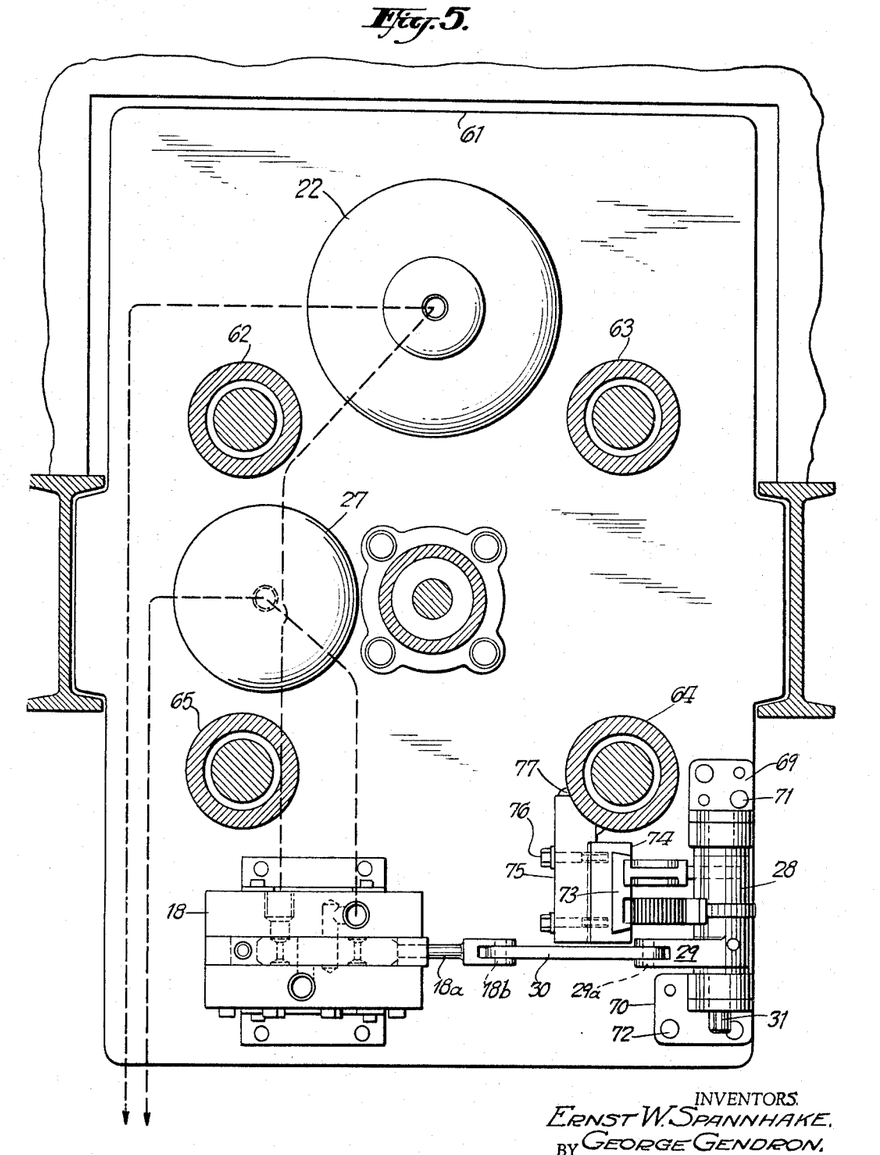
FIG. 5 is a further transverse sectional plan view of the FIG. 2 showing as taken substantially at 5—5 of FIG. 2.

Reference will now be had to FIGS. 2–7, inc., for a description of the constructional details of the hydraulic hammer assembly. The mechanism is carried by a welded-up steel housing consisting of upper and lower steel plates 60, 61, integrated by four interposed parallel tubes 62–65, inc., disposed in rectangular outline, FIG. 5, these tubes being welded at their lower ends to the base plate 61. Mounted on the base plate 61, and in the manner best shown in FIGS. 2, 5 and 6, is the inlet accumulator 22, the outlet accumulator 27 and the slide valve 18. The cam follower 28 is also rotatably mounted on the base plate in the manner best shown in FIGS. 4 and 5. As therein illustrated, the cam follower shaft 31, is journaled at its opposite ends in bearing blocks, integral with mounting plates 69, 70, which are bolted, as at 71, 72, to the base plate 61.

Referring to FIGS. 4, 5 and 6, the cams 32, 33, are integral with an actuating bar 73, which is slidably dovetailed in a truncated groove of a guide member 74, which in turn is mounted on a bracket 75, being bolted thereto, as at 76. The bracket 75 is welded, as at 77, to one of the steel tubes 64. The actuating bar 73, extends through an opening in the base plate 61 to the ram 11, and is rigidly secured thereto. Thus referring to FIG. 6, as the ram moves up and down, it carries with it the cams 32, 33, via the actuating bar 73, and thus actuates the cam follower 28 in the manner above described.

Referring to FIG. 6, the hydraulic cylinder 12 is universally suspended at its upper end from the plate 60, and for this purpose terminates at its upper end in a lug 78, having formed therein a socket-like aperture 78a of spherically concave contour, within which is disposed a ring member 78b of outer spherically convex contour for rotation in any direction within the socket-like aperture 78a. A bolt 80 extends through the aperture of the ring member 78b, and also extends at its opposite ends through bores of a pair of eyelet lugs 79, welded to the underface of plate 60. The lower end of the hydraulic cylinder extends through a bore 60a in the base plate 61, in the manner shown more clearly in FIG. 3, and such as to provide a slight clearance of about 3/16" between them. This suspension gives the hydraulic cylinder sufficient flexibility of movement to allow for misalignment and clearance between the hammer column sleeves 62–65, inc., and the ram 11.

Still referring to FIG. 3, the hydraulic piston rod 14 terminates at its lower end in a knob-like terminus 83, of sperical basal contour, which seats in a complementary cavity of a metal disc 85, which in turn is carried by a second disc 86 of malleable metal, such as aluminum, which latter is bolted, as at 87, to a metal point portion 88 of the ram, positioned to strike the cushion block 89, FIG. 2, in the base 90 for driving a core 91 into the ground. The knob terminus 83 of the piston rod is loosely anchored in the ram base by means of rings 93, 94, of the shapes in axial section shown, and upon the upper of which is seated an annular block 95, this assembly being held in place by ram keys 96, which are inserted in slots 97, extending transversely through the ram 11. A slight clearance of a few thousandths inch is provided between the knob terminus 83 and the ring 94, as at 97a, or alternatively between the rings 93 and 94 in order to permit the piston rod 14 to shift in any radial direction to avoid bending during driving.

Referring to FIGS. 2 and 4, the plumbing connections are designated the same as in FIG. 1, and hence require no further description.

Referring to FIGS. 2 and 6, a sheave housing 100 is secured to the upper housing plate 60, to which are journaled, as at 101, a pair of sheaves 103 entraining cables, as at 104, for suspending the hammer in position for driving a core or pile assembly.

Figure 7:
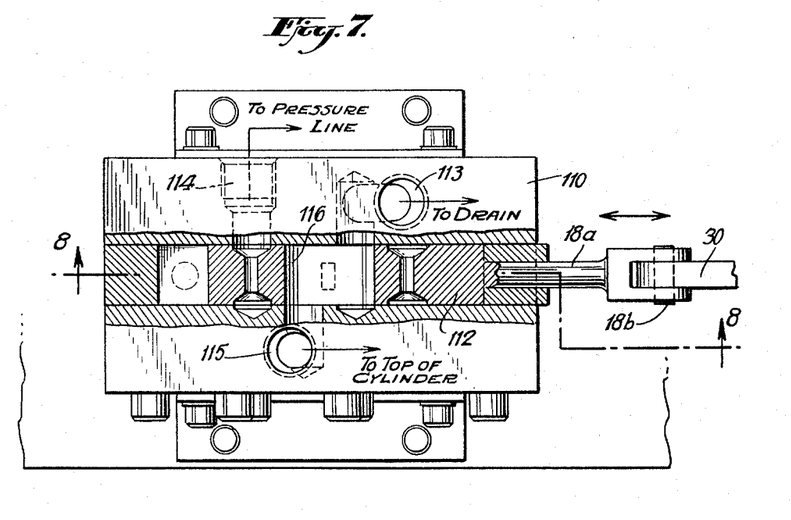
Figure 8:
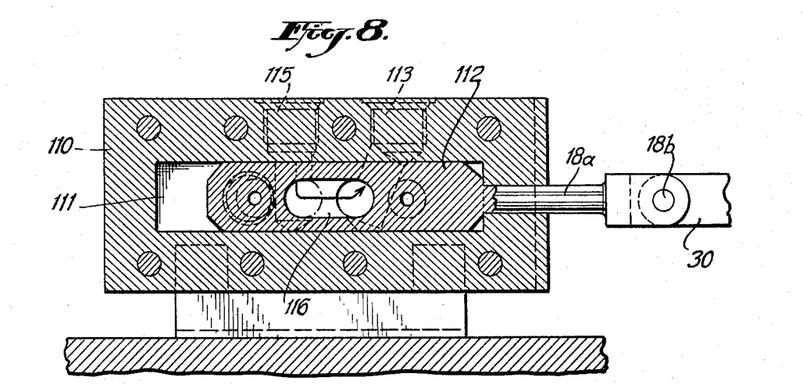
FIG. 8 is a longitudinal sectional elevation of the slide valve showing of FIG. 7 as taken at 8—8 thereof.

Referring now to FIGS. 7 and 8 for an explanation of the details of construction and operation of the cycling valve 18, it comprises a fixed member or housing 110, enclosing an inner elongated cavity 111 within which is slidably disposed an actuating slide member 112 integral with the slide arm 18a. The housing is penetrated by ports 113–115, inc., which open into the cavity 111 and which are respectively connected as indicated to the drain line, to the pressure line, and to line extending to the top of the hydraulic cylinder, these being connections 25, 20 and 23, respectively, of FIG. 1. The actuating member 112 is provided with a transversely extending central opening 116 of such length that with the member displaced furthest to the right, it spans and interconnects ports 113 and 115 in the manner illustrated in FIG. 7, thus connecting the top cavity of the hydraulic cylinder to drain, and thereby causing the piston and ram to ascend as above explained. Alternatively, with the slide member displaced furthest to the left, the central opening 116 therein is positioned to interconnect ports 114 and 115, thus connecting the top of the hydraulic cylinder to the pressure line, thus causing the piston and ram to descend.

As above stated, the ports 113–115, inc., are of sufficient opening area in relation to the length of the cavity of 116 of the actuating member as to provide sufficient overlap, such that the hammer cylinder 12 is always connected to an outside line, either the drain or pressure line, thus to prevent dangerous surges within the cylinder. As above explained the extent of this overlap is so related to the hammer movement through the aforesaid linkage between them that the interval of overlap is confined to a hammer movement of less than 0.8 inch on the upstroke, and such that at normal operating speed of the hammer, the pressure drop through the valve from the cylinder to the discharge of drain line is more than 60% and not more than 100% of the cylinder operating pressure when the slide member is in its centered position, thereby to assure that the hammer will be self-starting.

What is claimed is:

1. In a hydraulic hammer in combination: a supporting structure having an upper supporting member, a hydraulic cylinder pivotally suspended from said member by a universal joint coupling means permitting pivotal deflection of said cylinder in all radial directions, said cylinder having associated therewith a piston and rod with a hammering ram attached to said rod for delivering blows and means disposed about the base of said cylinder for restricting the extent of said pivotal, radial deflection.

2. In a hydraulic hammer in combination: a supporting structure having an upper supporting member, a hydraulic cylinder pivotally suspended from said member by a universal joint coupling means permitting pivotal deflection of said cylinder in all radial directions, means disposed about the base of said cylinder for restricting the extent of said pivotal, radial deflection; a piston displaceable within said cylinder having a piston rod integral therewith and projecting from the cylinder base and having a knob-like terminus, a ram secured coaxially to said terminus by means including a ring member surrounding the upper portion of said knob terminus and of an aperture providing a slight clearance between said ring member and knob to permit pivotal displacement thereof, and a plate disposed beneath said terminus having a cavity conforming substantially to the lower surface of said terminus for seating and centering the same during driving impact.

3. In a hydraulic ram in combination: a supporting structure including an upper support member having a pair of spaced lugs integral therewith, a hydraulic cylinder having a prong-like upper terminus disposed between said lugs, said terminus having an aperture therethrough of concave spherical contour, a ring member of convex spherical contour disposed in said aperture for rotation therein, and a bolt extending through said ring member and through aligned bores of said lugs, thereby pivotally to suspend said cylinder for pivotal deflection in any radial direction, said cylinder having associated therewith a piston and rod with a hammering ram attached to said rod for delivering blows and said supporting member including a guide member surrounding the base of said cylinder in slightly spaced relation thereto for limiting said pivotal, radial deflections of said cylinder.

4. In a hydraulic ram in combination: a supporting structure including an upper support member having a pair of spaced lugs integral therewith, a hydraulic cylinder having a prong-like upper terminus disposed between said lugs, said terminus having an aperture therethrough of concave spherical contour, a ring member of convex spherical contour disposed in said aperture for rotation therein, and a bolt extending through said ring member and through aligned bores of said lugs, thereby pivotally to suspend said cylinder for pivotal deflection in any radial direction, and said supporting member including a guide member surrounding the base of said cylinder in slightly spaced relation thereto for limiting said pivotal, radial deflection of said cylinder, a piston displaceable within said cylinder having a piston rod integral therewith and projecting from the cylinder base and having a knob-like terminus, a driving ram secured to said terminus by means including an anchoring ring surrounding the upper portion thereof and a seating member provided with a concave seating cavity disposed beneath said terminus, said ring being constructed and mounted to permit limited radial displacement of said rod terminus.

References Cited by the Examiner

UNITED STATES PATENTS

| 378,745 | 2/1888 | Warrington | 173—126 |
| 860,730 | 7/1907 | Cornell | 64—7 |
| 893,893 | 7/1908 | Barr et al. | 64—22 |
| 2,177,935 | 10/1939 | Buck | 173—127 |
| 2,274,091 | 2/1942 | Pavlecka et al. | 173—131 |
| 3,181,627 | 5/1965 | Cornett | 173—43 |

FRED C. MATTERN, JR., *Primary Examiner.*

MILTON KAUFMAN, *Examiner.*

L. P. KESSLER, *Assistant Examiner.*